US012113912B2

(12) United States Patent
Jang et al.

(10) Patent No.: US 12,113,912 B2
(45) Date of Patent: Oct. 8, 2024

(54) ELECTRONIC AUTHENTICATION DEVICE AND METHOD USING BLOCKCHAIN

(71) Applicant: Samsung Electronics Co., Ltd., Suwon-si (KR)

(72) Inventors: Wooseok Jang, Suwon-si (KR); Youna Lee, Suwon-si (KR); Moonsung Na, Suwon-si (KR); Euiheon Jeong, Suwon-si (KR); Seongmin Je, Suwon-si (KR); Beomsoo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 17/577,897

(22) Filed: Jan. 18, 2022

(65) Prior Publication Data
US 2022/0141036 A1 May 5, 2022

Related U.S. Application Data

(63) Continuation of application No. PCT/KR2020/009372, filed on Jul. 16, 2020.

(30) Foreign Application Priority Data

Jul. 18, 2019 (KR) .................. 10-2019-0086816

(51) Int. Cl.
H04L 9/32 (2006.01)
H04L 9/08 (2006.01)
H04L 9/00 (2022.01)

(52) U.S. Cl.
CPC .......... *H04L 9/3247* (2013.01); *H04L 9/0825* (2013.01); *H04L 9/0869* (2013.01);
(Continued)

(58) Field of Classification Search
None
See application file for complete search history.

(56) References Cited

U.S. PATENT DOCUMENTS 10,182,051 B1 1/2019 Andrade
10,263,772 B2 4/2019 Lee
(Continued)

FOREIGN PATENT DOCUMENTS

KR 10-1507817 B1 4/2015
KR 10-1637499 B1 7/2016
(Continued)

*Primary Examiner* — Syed A Roni
(74) *Attorney, Agent, or Firm* — Jefferson IP Law, LLP

(57) ABSTRACT

An electronic device is provided. The electronic device includes a communication device for transmitting or receiving a signal, a memory, and a processor connected to the communication device and the memory. The memory may store instructions for controlling the communication device so as to cause the processor to generate a key pair including a public key and a private key, receive authentication information from an authentication server by using the communication device, generate signature data by electronically signing the authentication information on the basis of the private key, generate transaction data including the signature data, transmit the transaction data to a blockchain network, and transmit transaction identification information corresponding to the transaction data to the authentication server.

16 Claims, 12 Drawing Sheets

(52) U.S. Cl.
CPC .......... *H04L 9/3228* (2013.01); *H04L 9/3263* (2013.01); *H04L 9/50* (2022.05); *H04L 2209/56* (2013.01)

(56) References Cited

U.S. PATENT DOCUMENTS

| | | |
|---|---|---|
| 11,082,420 B2 | 8/2021 | Uhr et al. |
| 2017/0180134 A1* | 6/2017 | King .................... H04L 63/045 |
| 2018/0227293 A1 | 8/2018 | Uhr et al. |
| 2019/0207813 A1* | 7/2019 | Uehara ................ H04L 9/3239 |
| 2020/0051074 A1 | 2/2020 | Suh et al. |
| 2021/0314313 A1 | 10/2021 | Uhr et al. |

FOREIGN PATENT DOCUMENTS

| | | |
|---|---|---|
| KR | 10-1661930 B1 | 10/2016 |
| KR | 10-2017-0079739 A | 7/2017 |
| KR | 10-1818601 B1 | 1/2018 |
| KR | 10-1837168 B1 | 3/2018 |
| KR | 10-1878869 B1 | 8/2018 |
| KR | 10-1903620 B1 | 10/2018 |
| KR | 10-2018-0129027 A | 12/2018 |
| WO | 2018/008800 A1 | 1/2018 |

* cited by examiner

ELECTRONIC AUTHENTICATION DEVICE AND METHOD USING BLOCKCHAIN

CROSS-REFERENCE TO RELATED APPLICATION(S)

This application is a continuation application, claiming priority under § 365(c), of an International application No. PCT/KR2020/009372, filed on Jul. 16, 2020, which is based on and claims the benefit of a Korean patent application number 10-2019-0086816, filed on Jul. 18, 2019, in the Korean Intellectual Property Office, the disclosure of which is incorporated by reference herein in its entirety.

BACKGROUND

1. Field

The disclosure relates to technologies of processing authentication in an electronic device.

2. Description of Related Art

A digital signature is a technology for preventing electronic documents or digital data from being falsified and identifying an entity which generates the signature, which is used when exchanging an electronic document or in a field such as an electronic commerce based on an information and communications network. There is a need for an electronic device to authenticate a user for a digital signature. As a representative user authentication scheme, a public key infrastructure (PKI) authentication scheme is a scheme which does not use client software, which is a universal serial bus (USB) token, a universal subscriber identity module (USIM), or the like. A scheme which uses client software is a scheme which stores and uses a public certificate. An electronic device may process a transaction such as remittance or payment using a public certificate or may sign an electronic document.

Furthermore, a blockchain technology of generating a block through collaboration of all of users who participate in the network, such that all the participants verify the generated block, approve it, and possess the same block, and preventing data forgery by some users is applied in various fields. The blockchain is a peer to peer (P2P) distributed ledger technology. The distributed ledger is protected by an encryption technology. It is possible to generate a block (information) only through negotiation between participating nodes. The blockchain is a technology of maintaining security and integrity in a distributed network environment where there is no centralized server. For example, various digital currencies such as Bitcoin, Ethereum, Ripple and various altcoins are emerging based on the blockchain. Other than the digital currencies, the blockchain may be used in a public authentication system or a copyright protection system. As an example of a method for authenticating a user based on the blockchain, there is a method for issuing a key pair issued from a private blockchain network and authenticating the user using the key pair.

The above information is presented as background information only to assist with an understanding of the disclosure. No determination has been made, and no assertion is made, as to whether any of the above might be applicable as prior art with regard to the disclosure.

SUMMARY

An entity (e.g., a server of a certificate authority) which issues a public certificate is important when a digital signature is processed using the public certificate. Thus, costs for issuing the public certificate are incurred. Furthermore, when the entity which issues the public certificate does not perform its function, there is a problem in which it is unable to prove the validity of the public certificate.

Even when the digital signature is processed based on a private blockchain, there is a problem of having to rely on an entity which issues a key pair. When authenticating a user using a public blockchain, a scheme of performing a signature using a certificate issued by a private institution and recording the hash value in the public blockchain may be used. However, the method for using the public blockchain simply proves that the digital file itself is not forged and has a problem in which it is difficult to authenticate whether the user is a certain user.

Aspects of the disclosure are to address at least the above-mentioned problems and/or disadvantages and to provide at least the advantages described below. Accordingly, an aspect of the disclosure is to provide an electronic device comprising a communication device for transmitting or receiving a signal, a memory, and a processor connected to the communication device and the memory.

Additional aspects will be set forth in part in the description which follows and, in part, will be apparent from the description, or may be learned by practice of the presented embodiments.

In accordance with an aspect of the disclosure, an electronic device is provided. The electronic device includes a communication device configured to transmit or receive a signal, a memory, and a processor electrically connected with the communication device and the memory. The memory may store instructions, when executed, causing the processor to generate a key pair including a public key and a private key, receive authentication information from an authentication server using the communication device, digitally sign the authentication information based on the private key to generate signature data, generate transaction data including the signature data, transmit the transaction data to a blockchain network, and control the communication device to transmit transaction identification information corresponding to the transaction data to the authentication server.

In accordance with another aspect of the disclosure, a method is provided. The method includes generating a key pair including a public key and a private key of a user, receiving authentication information from an authentication server, digitally signing the authentication information based on the private key to generate signature data, generating transaction data including the signature data, transmitting the transaction data to a blockchain network, and transmitting transaction identification information corresponding to transaction data to the authentication server.

In accordance with another aspect of the disclosure, a storage medium is provided. The storage medium stores a program for generating a key pair including a public key and a private key of a user, receiving authentication information from an authentication server, digitally signing the authentication information based on the private key to generate signature data, generating transaction data including the signature data, transmitting the transaction data to a blockchain network, and transmitting transaction identification information corresponding to transaction data to the authentication server.

According to embodiments disclosed in the disclosure, a blockchain network may be replaced with an entity which issues a public certificate to match a user with a key pair. Thus, furthermore, a private key of the user may service as a certificate capable of being used universally in several places depending on a level of user information of an institution which matches a key pair.

Furthermore, when authenticating the user according to embodiments disclosed in the disclosure in a digital currency service, it is possible for an institution which matches user information with a key pair to track the use of the digital currency of a person.

In addition, various effects ascertained directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
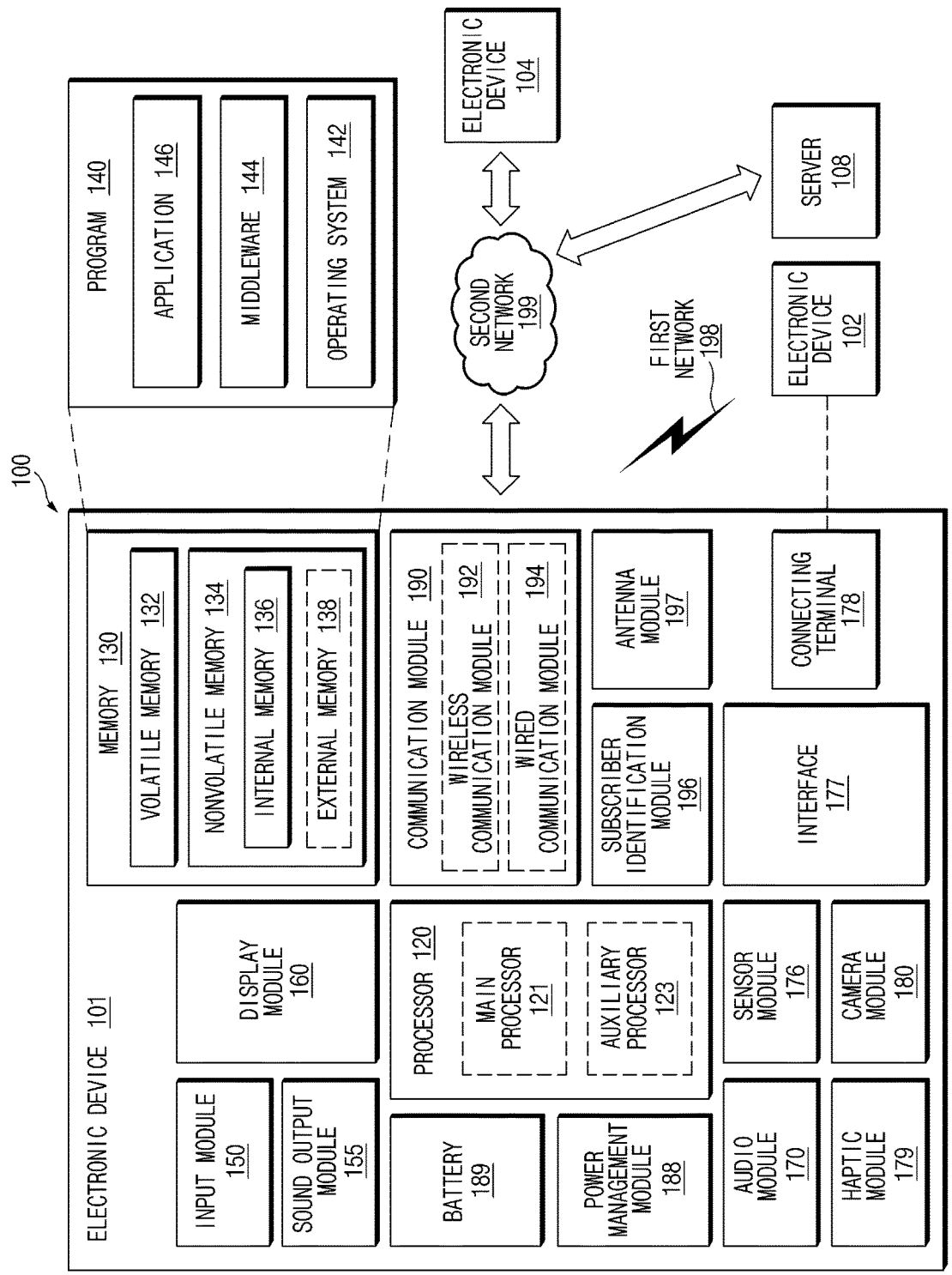
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
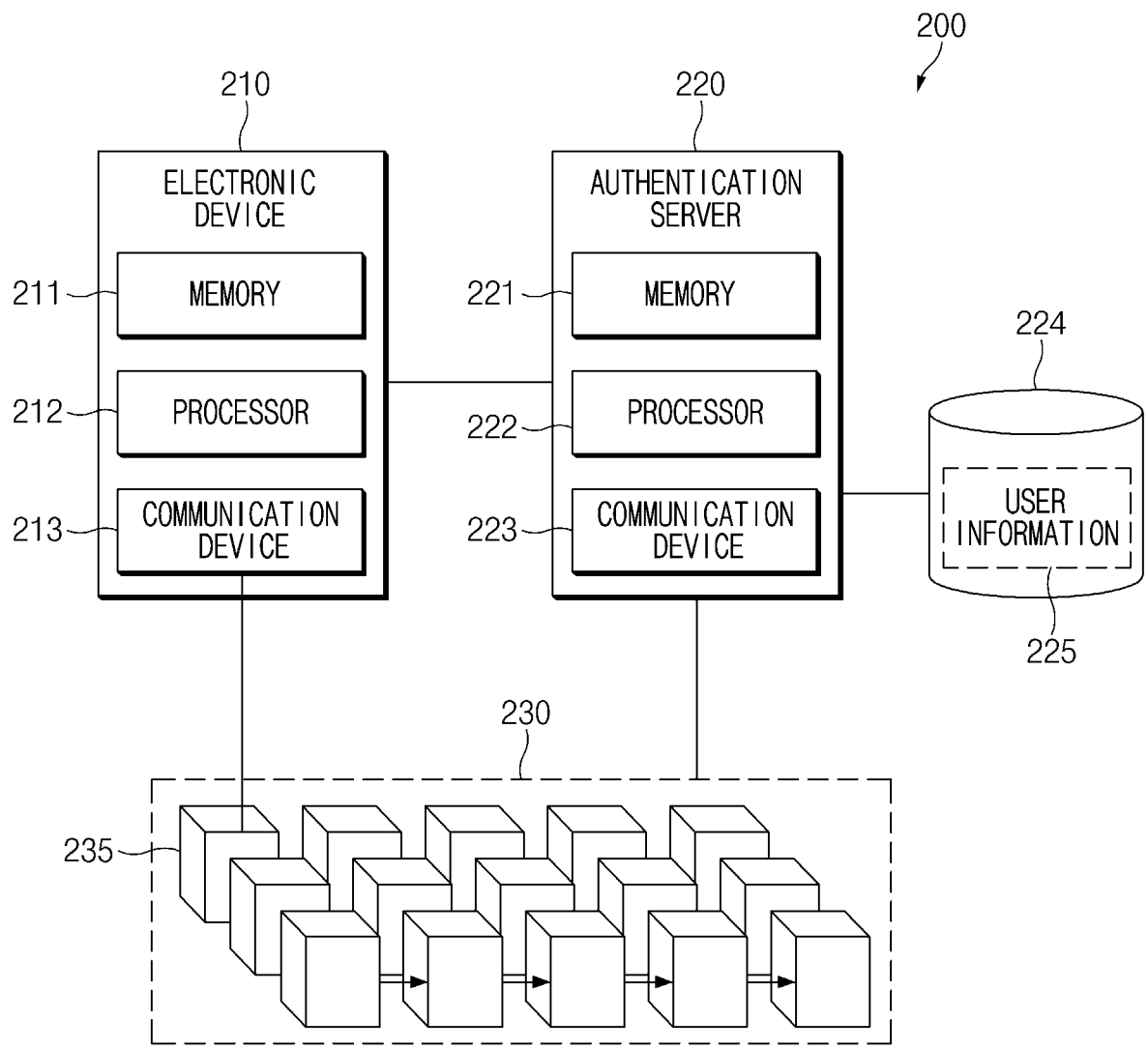
FIG. 2 illustrates a configuration of an electronic authentication system including an electronic device and an authentication server, according to an embodiment of the disclosure.

FIG. 2 illustrates a configuration of an electronic authentication system including an electronic device and an authentication server, according to an embodiment of the disclosure.

Referring to FIG. 2, an electronic authentication system 200 according to an embodiment may include an electronic device 210 (e.g., an electronic device 101 of FIG. 1), an authentication server 220 (e.g., a server 108 of FIG. 1), and a blockchain network 230.

According to an embodiment, the electronic device 210 may include a memory 211 (e.g., a memory 130 of FIG. 1), a processor 212 (e.g., a processor 120 of FIG. 1), and a communication device 213 (e.g., a communication module 190 or an antenna module 197 of FIG. 1). The memory 211 may store instructions, when executed, causing the processor 212 to process data or control a component of the electronic device 210 to perform an operation of the electronic device 210. The processor 212 may control the communication device 213 to transmit data to an external device (e.g., the authentication server 220 or a blockchain node 235) or receive data from the external device.

According to an embodiment, the authentication server 220 may include a memory 221, a processor 222, and a communication device 223. Furthermore, the authentication server 220 may have a database 224 including user information 225. The database 224 may be constructed in the memory 221 in the authentication server 220 or a separate storage medium. The authentication server 220 may include, for example, a server which manages customer information of an operator, a server which is constructed and operated by a financial institution (e.g., a bank), or a server which is operated by a certificate authority for authenticating a user.

The electronic device 210 may generate a key pair in asymmetric cryptography (e.g., public key cryptography). The key pair may include a private key and a public key.

The generated private key may be stored in a secure area of the memory 211 or a secure memory area (e.g., a trust zone) accessible through only a separate secure storage medium (e.g., a secure OS). According to an embodiment, the electronic device 210 may generate a key pair based on a root seed which uses various conditions of a mobile phone or a random algorithm. For example, the electronic device 210 according to an embodiment may use rivest-shamir-adleman (RSA) to generate a key pair. However, the algorithm for generating a key pair may be changed according to an embodiment. A user may select the authentication server 220 to register a public key among servers of several institutions. Because ranges of pieces of user information (e.g., a name, a personal identification number, a gender, an age, or the like) possessed for every several institutions are different from each other, the authentication server 220 may be selected according to a range needed to identify a key owner.

The electronic device 210 may receive authentication information from the authentication server 220. For example, the electronic device 210 may transmit a registration request to request registration of a public key to the authentication server 220 in response to a user input which is input to the electronic device 210. When transmitting the public key to the authentication server 220, the electronic device 210 may further transmit additional identification information (e.g., a phone number, a social security number, an account number, a card number, or the like) capable of identifying the user other than the public key. The authentication server 220 may authenticate the user using the public key, the identification information, or the like obtained from the electronic device 210. When the user is the authenticated user as a result of the authentication, the authentication server 220 may transmit authentication information to the electronic device 210 in response to the registration request of the electronic device 210. The authentication information may refer to information for identifying that the user of the electronic device 210 is a user who registers the public key with the authentication server 220. For example, the authentication information may include a one time password value or a nonce value generated by the authentication server 220. In the specification, the authentication information transmitted to the electronic device 210 by the authentication server 220 may be referred to as first authentication information.

The electronic device 210 may perform a digital signature of data including the authentication information received from the server (e.g., the nonce value or the one time password (OTP) value generated by the server) using the private key. The electronic device 210 may generate signature data as a result of the digital signature. For example, the electronic device 210 may perform a digital signature of data including at least one piece of authentication information based on the private key. The digital signature may include, for example, an operation where the electronic device 210 encrypts data based on the private key. The electronic device 210 may generate a hash value (e.g., a first hash value) from data including authentication information using a hash function. For example, the electronic device 210 may obtain a hash value using a hash function such as secure hash algorithm (SHA) 256 from the authentication information. The electronic device 210 may perform a digital signature based on the obtained hash value and the private key. The signature data where the digital signature is completed may include encryption data where the hash value is encrypted using the private key.

Figure 3:
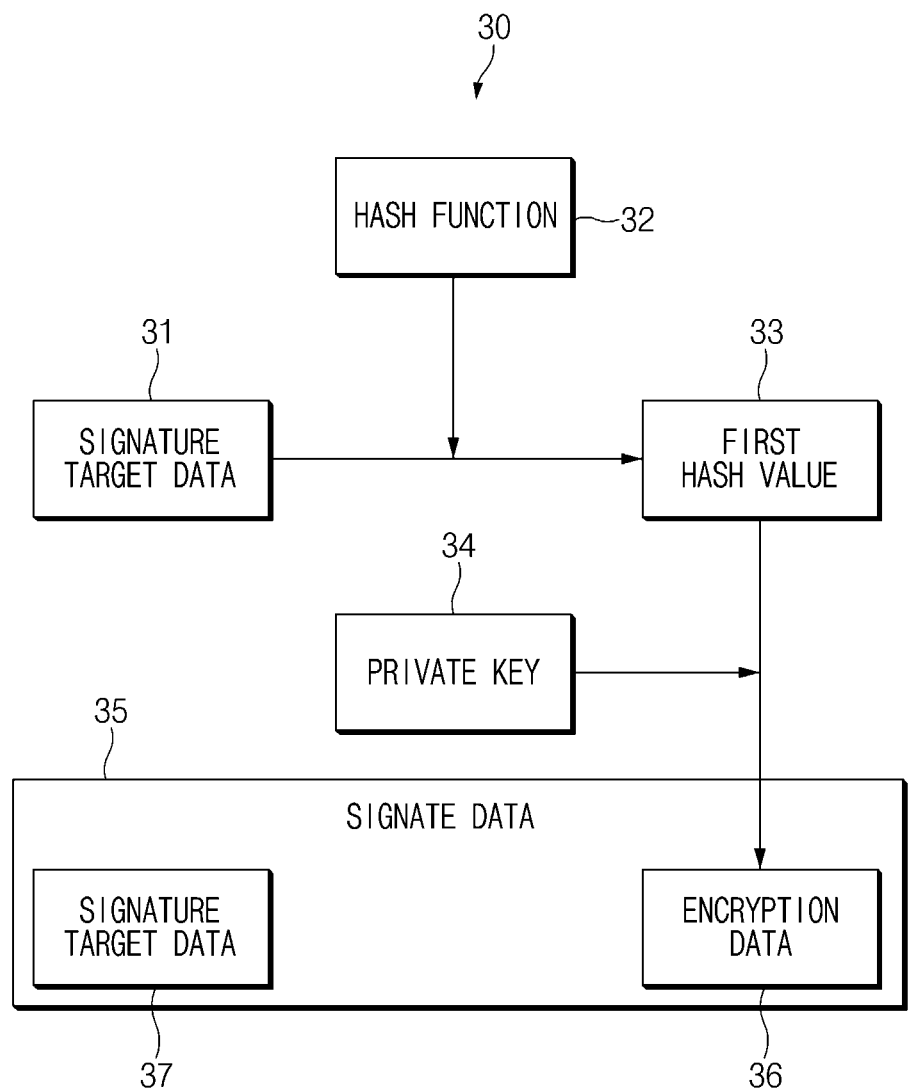
FIG. 3 is a block diagram for describing a method for performing a digital signature based on asymmetric cryptography, according to an embodiment of the disclosure.

FIG. 3 is a block diagram for describing a method for performing a digital signature based on asymmetric cryptography, according to an embodiment of the disclosure.

Referring to FIG. 3 depicting a block diagram 30, according to an embodiment, an electronic device (e.g., an electronic device 101 of FIG. 1) may perform a digital signature based on asymmetric cryptography. For example, a user may obtain a first hash value 33 from signature target data 31 (e.g., data including first authentication information) using a hash function 32. For example, the electronic device may input the signature target data 31 to the hash function 32 and may obtain the converted value as the first hash value 33. According to an embodiment, the signature target data 31 may further include another piece of information other than first authentication information. The electronic device may generate encryption data 36 by encrypting the first hash value 33 using a private key 34 of the user. The electronic device may generate signature data 35 including the encryption data 36 and the signature target data 37 (e.g., the first authentication information). The signature target data 37 may include the same data as at least a portion of the signature target data 31. However, in various embodiments, the process of performing a digital signature may be performed is not limited to the above-mentioned scheme, and the digital signature may be performed by means of an additional algorithm or a changed scheme associated with the digital signature.

Figure 4:
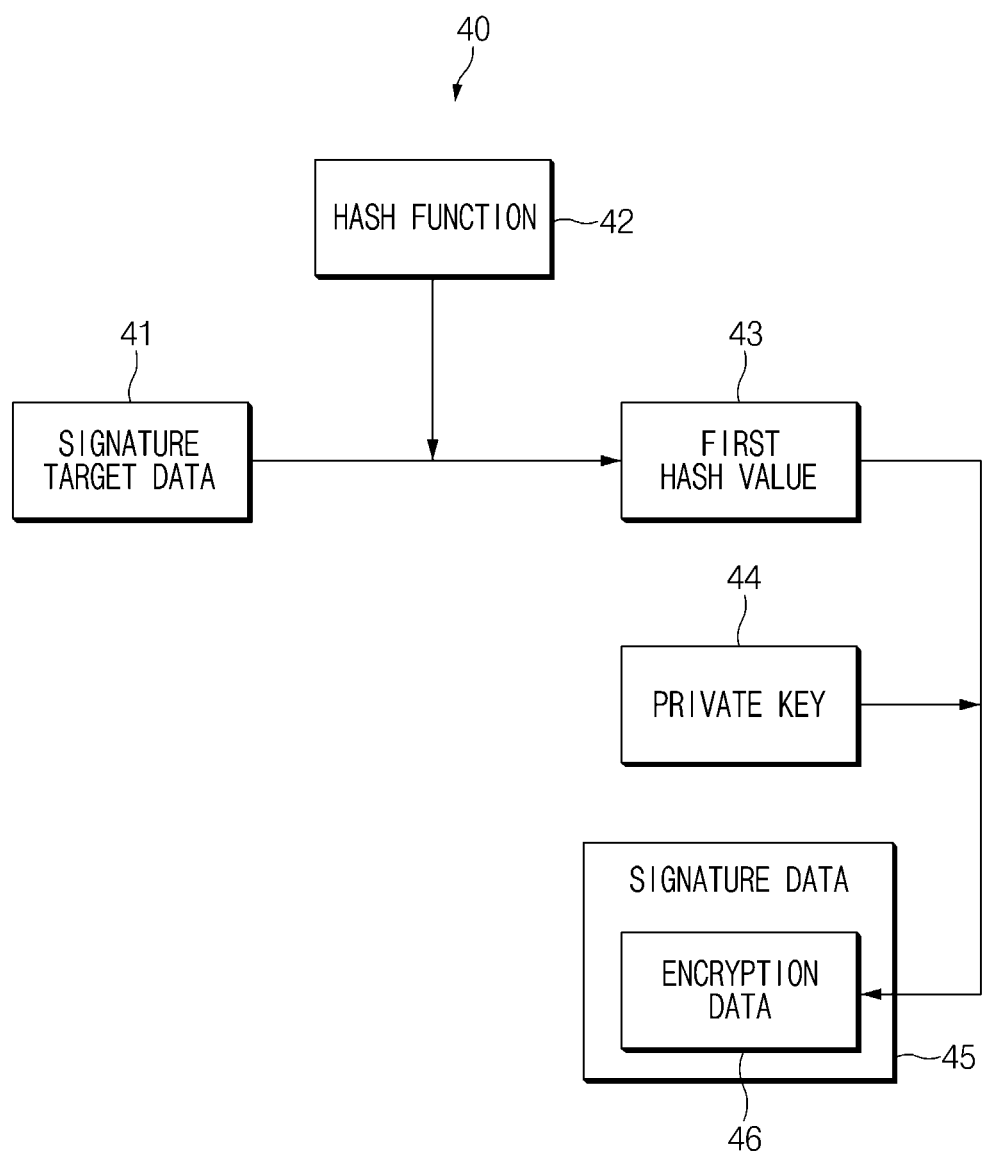
FIG. 4 is a block diagram for describing a method for performing a digital signature, according to an embodiment of the disclosure.

FIG. 4 is a block diagram for describing a method for performing a digital signature, according to an embodiment of the disclosure.

Referring to FIG. 4 depicting block diagram 40, according to an embodiment, signature data 45 may be encryption data 46 generated when an electronic device (e.g., an electronic device 101 of FIG. 1) performs a digital signature (a second digital signature method). For example, the electronic device may obtain a first hash value 43 from signature target data 41 (e.g., data including first authentication information) using a hash function 42. According to an embodiment, the signature target data 41 may further include another piece of information other than the first authentication information. The electronic device may generate the encryption data 46 by encrypting the first hash value 43 obtained using the hash function 42 based on a private key 44 of a user. Based on the encryption data, the electronic device may generate signature data. In the specification, the above-mentioned process may be referred to as a process of performing a digital signature based on a private key of the user. According to an embodiment, the signature data 45 (or 35 of FIG. 3) may be transmitted to a blockchain network using a communication device 223 to be stored through a node which participates in a blockchain.

Figure 5:
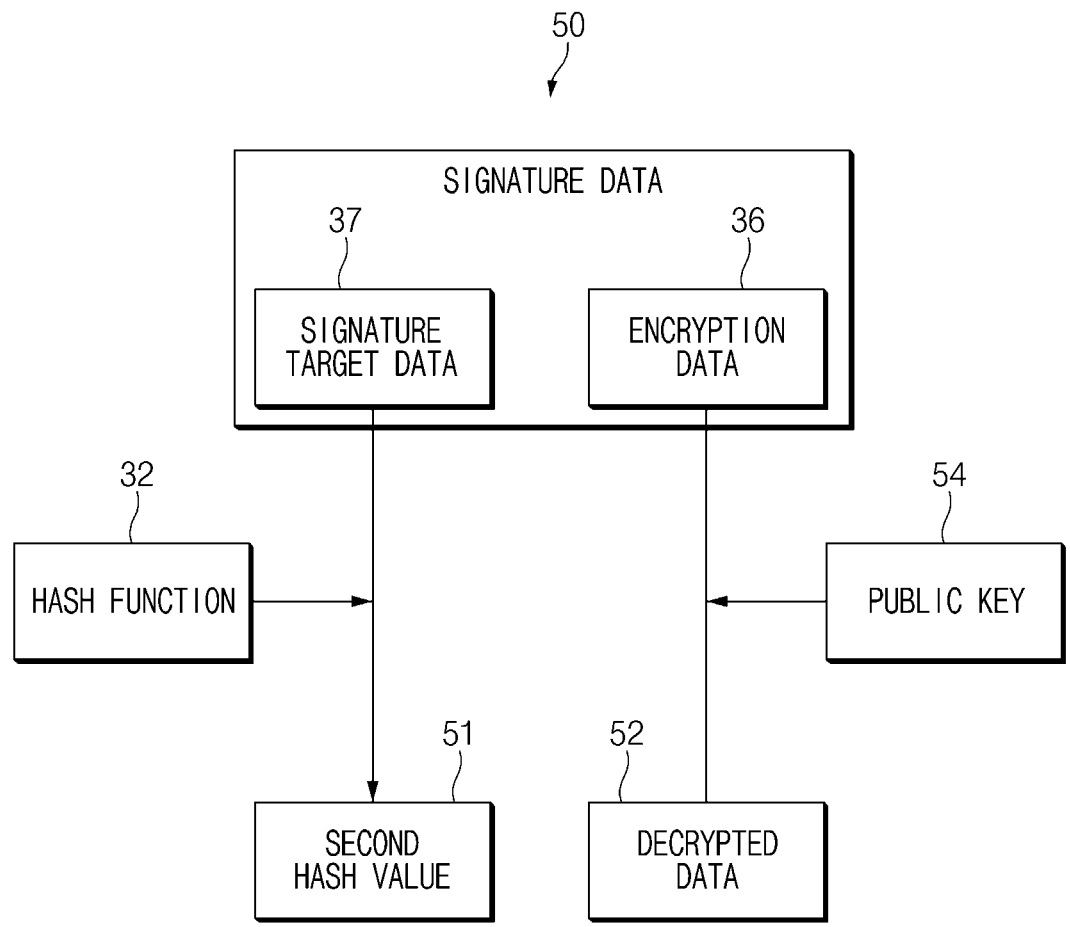
FIG. 5 is a block diagram for describing a method for identifying validity of signature data digitally signed, according to an embodiment of the disclosure.

FIG. 5 is a block diagram for describing a method for identifying validity of signature data 35 digitally signed, according to an embodiment of the disclosure.

Referring to FIG. 5 depicting a block diagram 50, when performing a digital signature using a method shown in FIG. 3, an electronic device (e.g., an electronic device 210 of FIG. 2) or a server (or an authentication server 220 of FIG. 2) may obtain signature data 35 including signature target data 37 and encryption data 36. The electronic device or the server may obtain the signature target data 37 and the encryption data 36 from the signature data 35. The electronic device or the server may decrypt the encryption data 36 based on a public key 54 forming a key pair with a private key (e.g., a private key 34 of FIG. 3). The electronic device or the server may obtain a second hash value 51 from the signature target data 37 using a hash function 32. The electronic device or the server may compare the second hash value 51 with the value decrypted from the encryption data 36. The electronic device or the server may identify validity of the digital signature based on the compared result. For example, when the second hash value 51 and the value decrypted from the encryption data 36 are different from each other, the electronic device or the server may determine that the digital signature is not valid. On the other hand, when the second hash value 51 and the value decrypted from the encryption data 36 are the same as each other, the electronic device or the server may determine that the digital signature is valid.

Figure 6:
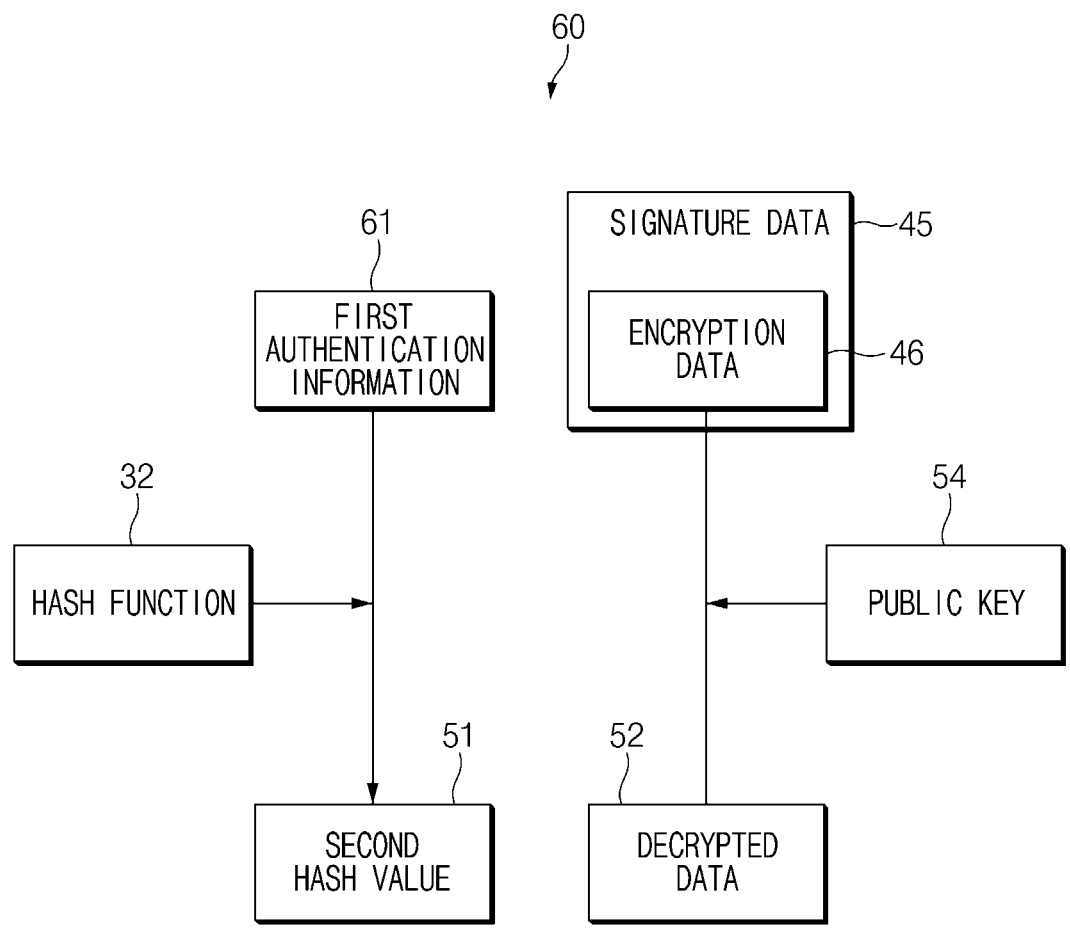
FIG. 6 is a block diagram for describing a method for identifying validity of signature data digitally signed, according to an embodiment of the disclosure.

FIG. 6 is a block diagram for describing a method for identifying validity of signature data digitally signed, according to an embodiment of the disclosure.

Referring to FIG. 6 depicting block diagram 60, when performing a digital signature using a method shown in FIG. 4, a server (or an authentication server 220 of FIG. 2) may obtain signature data 45 over a blockchain network (e.g., a blockchain network 230 of FIG. 2) by means of a blockchain transaction identifier. The server may decrypt encryption data included the obtained signature data 45 (e.g., encryption data 46 encrypted based on a private key (e.g., private key 44 of FIG. 4) by an electronic device). The server may store first authentication information (e.g., an OTP value or a nonce value) 61 transmitted to the electronic device of a user. The server may generate the second hash value 51 from the stored first authentication information 61 using a hash function. The server may verify validity of the digital signature, based on the result of comparing the generated second hash value 51 and decrypted data 52 in which the encryption data 46 is decrypted. For example, when the decrypted data and the second hash value 51 are matched with each other, the electronic device or the server may determine that the digital signature is performed by an authenticated user to identify that the digital signature is valid. When the decrypted data and the second hash value 51 are not matched with each other, the electronic device or the server may identify that the digital signature is not valid.

Referring again to FIG. 3, an electronic device 210 may transmit a blockchain transaction for recording the generated signature data in a blockchain node 235 included in a blockchain network 230 to the blockchain network 230. The at least one blockchain node 235 which participates in the blockchain network 230 may verify the blockchain transaction received over the network. When the verified blockchain transaction is a normal transaction, the at least one blockchain node 235 may generate a block having information about the blockchain transaction. The generated block may be connected with a previously generated block to be stored on a blockchain. The generated block may be stored in a data area of the node. Herein, information about a transaction ID may be recorded in the block. A device (e.g., the electronic device 210 or the authentication server 220) which accesses the blockchain network 230 may identify pieces of data of the transaction stored in the block based on the transaction ID. The data recorded in the blockchain node 235 may be referred to as transaction data. According to an embodiment, the blockchain network 230 may be a public blockchain network. When signature data is recorded based on the public blockchain network, a user may be authenticated without a separate certificate issuing authority. According to another embodiment, the blockchain network 230 may be a private blockchain network. According to an embodiment, when the blockchain network 230 is the public blockchain network, a node in which signature information is stored may be a plurality of unspecified public nodes. For a public blockchain, anyone may identify pieces of data stored in a block based on a transaction ID. Thus, when the blockchain network 230 is the public blockchain network, the public blockchain network may match a person with a key pair to be replaced with an existing certificate authority separately needed to authenticate the person. When the blockchain network 230 is a private blockchain network operated by an entity such as an institution or a consortium, a key pair used in the blockchain network 230 may be issued by an entity which operates the blockchain network 230. However, a type of the blockchain network is not limited to the described blockchain, which may be implemented by various blockchains.

The electronic device 210 may obtain transaction identification information (TXID) (a transaction ID) in response to the result of recording the signature data in the blockchain node 235. The transaction recorded in the blockchain node 235 may be identified by means of the transaction identification information, and signature data included in the corresponding transaction data may be identified. According to an embodiment, the transaction identification information may include a transaction ID generated when transaction data is recorded in the blockchain node 235. According to an embodiment, the transaction ID may be generated using various pieces of data associated with a blockchain transaction. Various pieces of data may be generated using, for example, software version information, the number of input values, a hash value generated from data of a previous transaction, or a sequence value. According to an embodiment, the electronic device or a device included in the blockchain network may decode data associated with the transaction into a hex value and may generate a hash value using a hash function (e.g., SHA 256) by means of the decoded value. The electronic device or the device included in the blockchain network may encode the generated hash value to generate a transaction ID. The method of generating the transaction ID is not limited to the described contents. The transaction ID may be generated by various methods according to a type or characteristic of the blockchain. The transaction ID may be generated by the electronic device or the blockchain network. The transaction ID may be obtained by converting signature data transmitted in an electronic transaction process of transacting a digital currency into a string. The electronic device may query for or identify a hash value generated for a transaction using the transaction ID. The transaction ID may be an identifier for distinguishing a transaction recorded in the blockchain network. Transaction data may include, for example, sending account information, receiving account information, a balance, a deposit amount, and the other data. The receiving account information may include a blockchain address value for an account to the deposit amount should be transmitted, when a blockchain transaction is generated. According to an embodiment, the receiving account information may include an address of a contract to record data in the blockchain network.

According to an embodiment, the authentication server 220 or the electronic device 210 may generate a contract to perform recording in the blockchain network. According to an embodiment, when generating a contract, the authentication server 220 may transmit the generated contract address to the electronic device 210 such that the electronic device 210 may store signature data signed by a public key or a private key through the contract corresponding to the contract address. According to an embodiment, when generating a contract, the electronic device 210 may store signature data signed by a public key or a private key on a node of a blockchain through the generated contract.

According to an embodiment of the disclosure, the authentication server 220 may provide the electronic device 210 with the account information of the user. The authentication server 220 may generate a contract (e.g., a smart contract) capable of storing and identifying information for authentication of the user in the blockchain node. The authentication server 220 may provide the electronic device 210 with information associated with the contract such that the electronic device 210 records pieces of information (e.g., signature data and the public key) associated with various authentication, through the generated contract.

According to an embodiment, the electronic device 210 may transmit transaction identification information (TXID) of a blockchain to the authentication server 220. The electronic device 210 may further transmit the public key to the authentication server 220 to register the public key. According to another embodiment, rather than directly transmitting the public key to the authentication server 220, the electronic device 210 may record the public key in the other data area of transaction data.

Receiving the transaction identification information, the authentication server 220 may access transaction data stored in the blockchain node from the blockchain network 230 using the transaction identification information and may obtain signature data included in transaction data stored in the data area of the block. According to an embodiment of the disclosure, the authentication server 220 may obtain the public key from the electronic device 210 or the blockchain network 230. According to an embodiment, the authentication server 220 may verify validity of signature data, which is digitally signed, using the public key. The authentication server 220 may store and manage each of pieces of user information, public key information corresponding to the user information, and authentication information (first authentication information) (e.g., an OTP value or a nonce value) assigned to the user. According to an embodiment, the authentication server 220 may internally generate a private key or a public key. Furthermore, the authentication server 220 may generate a transaction of a blockchain. According to an embodiment, when internally generating a contract, the authentication server 220 may transmit a blockchain address of the generated contract to the electronic device, such that the electronic device accesses the generated contract. The authentication server 220 may decrypt the signature data obtained from the blockchain using the public key of the user.

The authentication server 220 may compare the decrypted data with a value (a second hash value) generated by means of a hash function from authentication information stored in the authentication server 220. The authentication server 220 may identify whether the data obtained from the blockchain network is data which is signed by the same person as the user who registers the public key based on the compared result.

The authentication server 220 may decrypt at least a portion of the signature data obtained over the blockchain network using the public key. The authentication server 220 may compare the data decrypted from the signature data with authentication information stored in the authentication server 220 (i.e., authentication information transmitted to the electronic device 210).

For example, the server or the electronic device may identify whether the data in which the at least a portion of the signature data is decrypted by the public key is matched with a hash value (a first hash value) generated using the hash function based on authentication information obtained from the server by the electronic device. The authentication server 220 may compare a second hash value generated using the hash function from the authentication information stored in the authentication server with the data in which the at least a portion of the signature data obtained over the blockchain network is decrypted. When the decrypted data and the second hash value are the same as each other, the authentication server 220 may determine that the signature data is information generated by the user who registers the public key. When the decrypted data and the second hash value are the same as each other, it may be determined that the digital signature is valid.

According to an embodiment, the authentication server 220 may compare values calculated through an additional operation (e.g., a hash function or a digest) for comparison of authentication information.

According to an embodiment of the disclosure, the authentication server 220 may identify whether the signature data obtained over the blockchain network based on the transaction identification information is signed by the electronic device 210.

According to an embodiment of the disclosure, an operation of identifying a user who signs the signature data may be performed based on first authentication information and second authentication information transmitted to the electronic device 210 by the authentication server 220. For example, the authentication server 220 may compare the first authentication information with the second authentication information obtained from the signature data using the public key. When the public key obtained by the authentication server 220 is a normal public key and when the obtained signature data is signed by the electronic device 210, the second authentication information may be matched with the first authentication information. The authentication server 220 may compare the first authentication information with the second authentication information. When the first authentication information and the second authentication information are matched with each other, the authentication server 220 may map and store the public key and user information 225 in a database 224. To identify the user who signs the signature data, the authentication server 220 may decrypt the signature data using the public key. When the signature data is decrypted, the authentication server 220 may obtain the second authentication information. According to an embodiment, when a hash value generated from the first authentication information and the second authentication information are identical to each other, the authentication server 220 may identify that a user who performs a signature and records signature data in the blockchain network is the same user as a user who receives authentication information.

Thereafter, the user of the electronic device 210 may use a private key as the same purpose as a certificate for authenticating the user. According to an embodiment, when authentication of the user is needed, the electronic device 210 may performs a digital signature using the private key and may transmit the digitally signed data to the authentication server 220. The authentication server 220 may obtain authentication data, recorded in at least one block included in a node which participates in the blockchain network 230, by means of transaction identification information. Furthermore, the authentication server 220 may decrypt the signature data using the stored public key of the user. A digital signature identifying process of comparing the information obtained as a result of the decryption with the authentication information stored in the authentication server and identifying whether the signature data is data generated by the same user may be performed. According to an embodiment, the public key may be identified based on the recorded data, and the digitally signed data may be identified based on the identified public key. Thus, as an attacker has a private key and a public key generated in asymmetric cryptography, transmits data signed using his or her private key, and is prevented from identifying the signature using the public key of the attacker, high-level security may be provided.

According to an embodiment, the electronic device 210 may transmit a public key using a smart contract. The electronic device 210 may include the public key in the smart contract and may transmit the public key to the authentication server 220.

Figure 7:
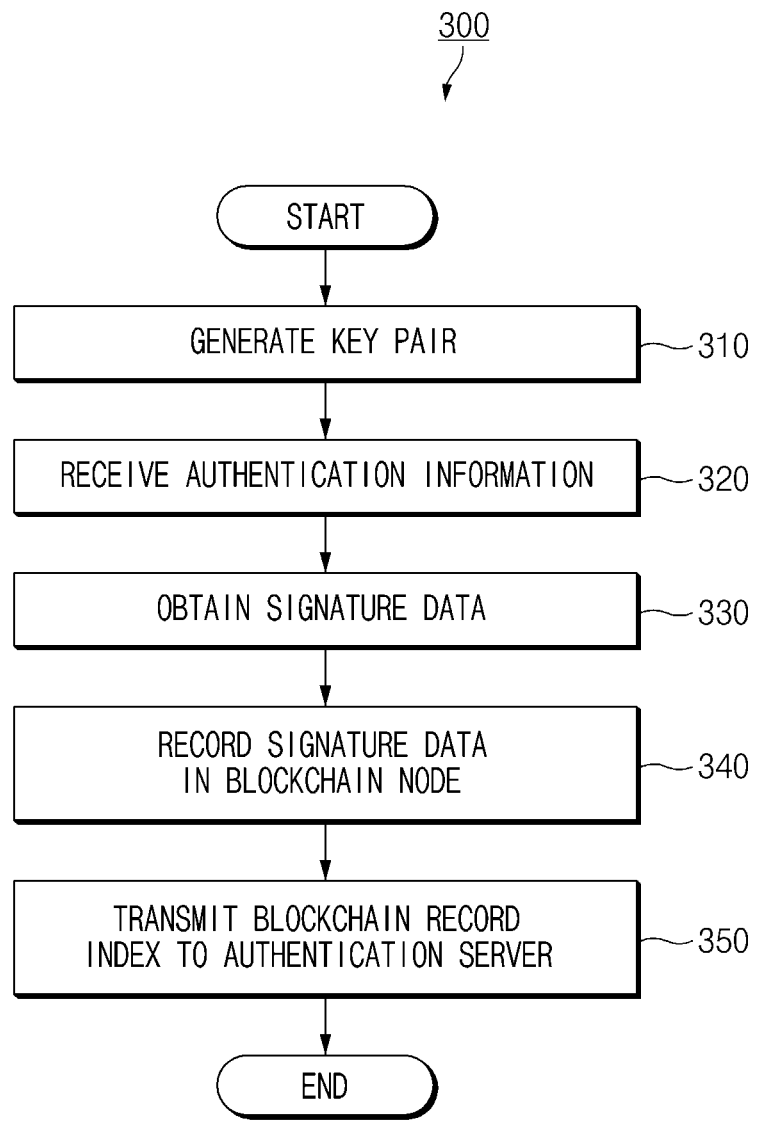
FIG. 7 is a flowchart illustrating a process performed to process electronic authentication by an electronic device, according to an embodiment of the disclosure.

FIG. 7 is a flowchart illustrating a process performed to process electronic authentication by an electronic device, according to an embodiment of the disclosure.

Referring to FIG. 7 depicting a flowchart 300, according to an embodiment, in operation 310, an electronic device (e.g., an electronic device 101 of FIG. 1 or an electronic device 210 of FIG. 2) may generate a key pair. According to an embodiment, the electronic device may generate or obtain a root seed for generating a key pair available in a blockchain network (e.g., a blockchain network 230 of FIG. 2). According to an embodiment, the electronic device 210 may generate a key pair based on the root seed. According to an embodiment, the root seed may refer to a value randomly generated within a condition of a range available in the blockchain network 230. The root seed may be generated based on a dynamic feature generated during an operation of the electronic device 210. For example, the electronic device 210 may generate a root seed from a value output from a temperature sensor of the electronic device 210, a current value of a specific position, or the like. For another example, the electronic device 210 may generate a root seed using a unique value of a hardware chip included in the electronic device 210.

According to an embodiment, the electronic device 210 may transmit a public key in the generated key pair to the authentication server 220. The authentication server 220 may register the public key received from the electronic device 210 as a public key for a user of the electronic device 210. For example, the electronic device 210 may transmit a request for registration of the public key, which includes the public key to register the public key, to the authentication server 220. Additional information about the user other than the public key may be further stored in the authentication server 220. According to an embodiment, when transmitting the request for registration, the electronic device 210 may further transmit user information capable of identifying the user of the electronic device 210 to the authentication server. For example, the authentication server 220 may further store contact information of the user or an ID of a user account.

In operation 320, the electronic device may receive the authentication information from an authentication server (e.g., the authentication server 220 of FIG. 2). For example, the electronic device 210 may receive the authentication information in response to the request for registration transmitted to the authentication server.

In operation 330, the electronic device may obtain signature data based on the authentication information and a private key. For example, the electronic device may encrypt data including the authentication information using the private key.

In operation 340, the electronic device may transmit the signature data to a blockchain network to record the signature data as transaction data in a blockchain node. When the signature data is recorded in the blockchain node, the electronic device may obtain transaction identification information about the recorded signature data. When the transaction data is transmitted to the blockchain network, the electronic device may obtain a transaction ID for the transaction data. The electronic device may obtain transaction identification information including the transaction ID.

In operation 350, the electronic device may transmit the transaction identification information about the signature data recorded in the blockchain node to the authentication server.

For a more specific example, for example, the electronic device may generate "0xAAAA" as a public key. Furthermore, when an authentication value including "1234" as an OTP value is received from the authentication server, the electronic device may generate the following signature.

Hash=web3.sha3("1234")

Signature=web3.personal.sign(hash, "0xAAAA", function( ){ . . . });

The electronic device may sign the above information using the private key and may generate and transmit a blockchain transaction to the blockchain network to record the signed data in the blockchain node. "0xBBBB" which is a transaction identifier (e.g., a transaction ID) of the transaction data transmitted to the blockchain network may be recorded in a block of the blockchain node in which the signed data is recorded. The electronic device may transmit information including "0xBBBB" to the authentication server.

Figure 8:
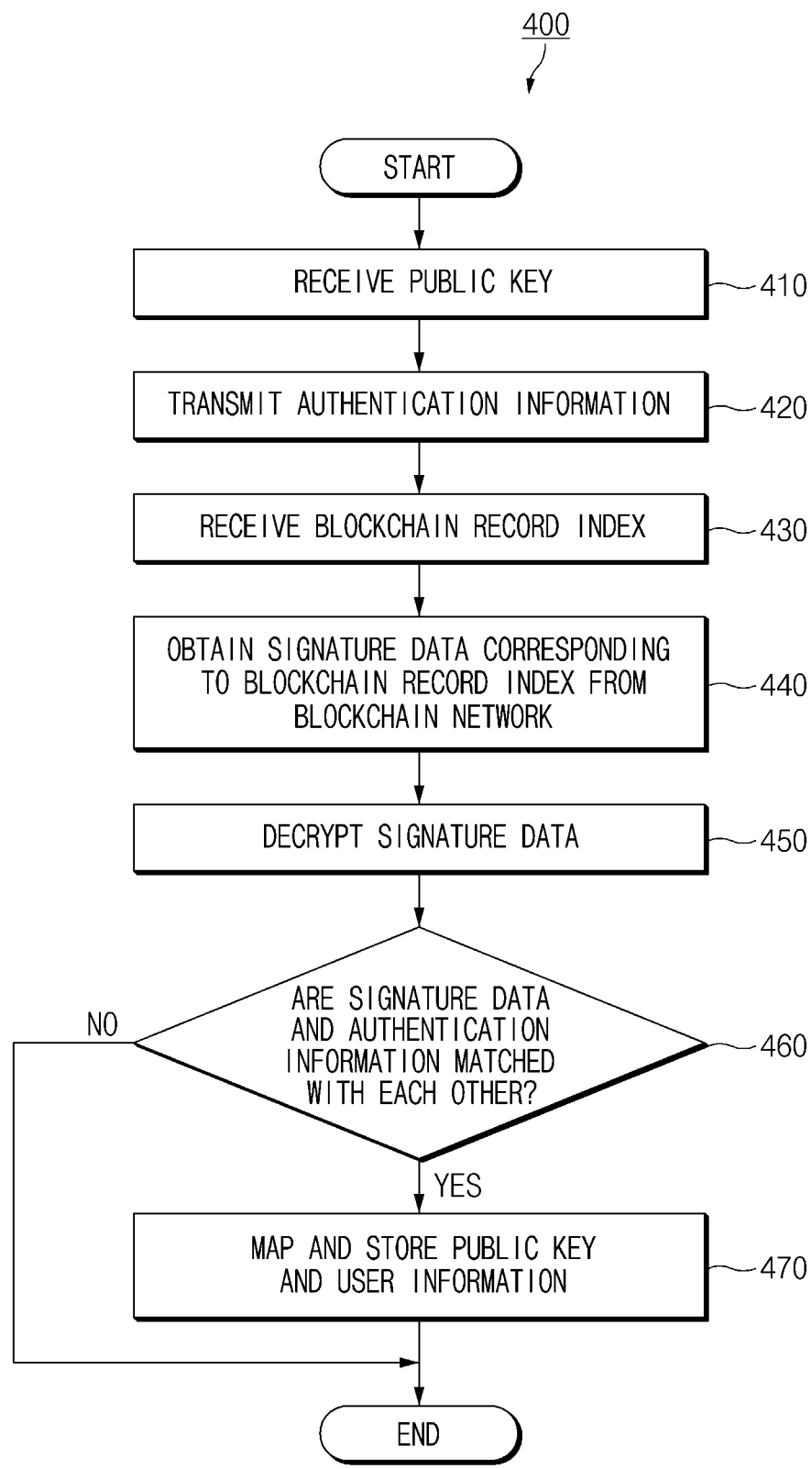
FIG. 8 is a flowchart illustrating a process performed to process electronic authentication by an authentication server, according to an embodiment of the disclosure.

FIG. 8 is a flowchart illustrating a process performed to process electronic authentication by an authentication server, according to an embodiment of the disclosure.

Referring to FIG. 8 depicting a flowchart 400, according to an embodiment, in operation 410, an authentication server (e.g., an authentication server 220 of FIG. 2) may receive a public key from an electronic device (e.g., an electronic device 101 of FIG. 1 or an electronic device 210 of FIG. 2). For example, the authentication server may receive a request for registration of the public key, which includes the public key. According to an embodiment, the authentication server may further receive user information about a user of the electronic device which transmits the request for registration. The authentication server may search for user information (e.g., user information 225 of FIG. 2) stored in a database provided in the authentication server based on the received user information. According to an embodiment, the authentication server 220 may associate and manage the received public key and the received user information. For example, the authentication server 220 may identify the registered user using the received public key and the received user information (e.g., a phone number, an ID, an email address or the like) and may construct a database which uses a public key of the identified user.

In operation 420, in response to the request for registration, the authentication server may transmit authentication information to the electronic device. For example, the authentication server may transmit authentication information (first authentication information) including "1234" as an OTP value to the electronic device. According to an embodiment, the authentication server 220 may use a database which stores and manages the first authentication information together with the registered user information or the public key.

In operation 430, the authentication server may receive transaction identification information (TXID) from the electronic device. For example, the authentication server may receive the transaction identification information including "0xBBBB" as a transaction ID.

In operation 440, the authentication server 220 may obtain signature data corresponding to the transaction identification information from a blockchain network (e.g., a blockchain network 230 of FIG. 2). For example, the authentication server may identify data digitally signed using a private key of a user by the electronic device, by means of the blockchain network. According to an embodiment of the disclosure, the signed data may be obtained by means of a third party server or a service provider (e.g., Etherscan) which has a transaction ID and provides data included in a transaction.

In operation 450, the authentication server may decrypt the signature data using a public key and may identify whether the signature data is data signed using a private key forming a key pair with the public key. For example the authentication server may generate data based on a public key of the user and a hash function from the first authentication information stored in the server. The authentication server may decrypt signature data obtained from the blockchain network to obtain second authentication information. The authentication server may identify whether it is signed by the same user using the second authentication information. According to an embodiment, the authentication server may identify the user using a value except for the first authentication information. For example, the authentication server may identify the user by further using pieces of information associated with the user and may identify whether the signature data and the authentication information are matched with each other using a series of algorithms associated with preventing denial of the digital signature.

According to an embodiment, when the signature data obtained over the blockchain network is normally decrypted using the public key of the user, the authentication server may obtain authentication information (the second authentication information) from the signature data. The authentication server may compare the authentication information (the second authentication information) obtained from the signature data with the authentication information (the first authentication information) transmitted to the electronic device. When the authentication information (the second authentication information) obtained from the signature data and the authentication information (the first authentication information) transmitted to the electronic device are identical to each other, in operation 460, the electronic device may determine that the signature data and the authentication information are matched with each other. For example, the authentication server may determine whether the authentication information obtained from the signature data is "1234." According to an embodiment, whether the first authentication information and the second authentication information are identical to each other may be determined using the method proposed in FIG. 5 or 6 and the related description. In other words, according to an embodiment, the authentication server may compare hash values obtained from authentication information rather than the authentication information itself to determine whether the first authentication information and the second authentication information are identical to each other.

When the signature data and the authentication information are matched with each other, in operation 470, the authentication server may map and store the public key with user information stored in the database. According to an embodiment, the user information mapped to the public key may be information corresponding to the user information received together with the request for registration among pieces of information stored in the database.

According to an embodiment, the authentication server may further map and store the transaction identification information received in operation 430 and the user information. In other words, the authentication server may allow the database to map and store the user information, the transaction identification information, and the public key.

Figure 9:
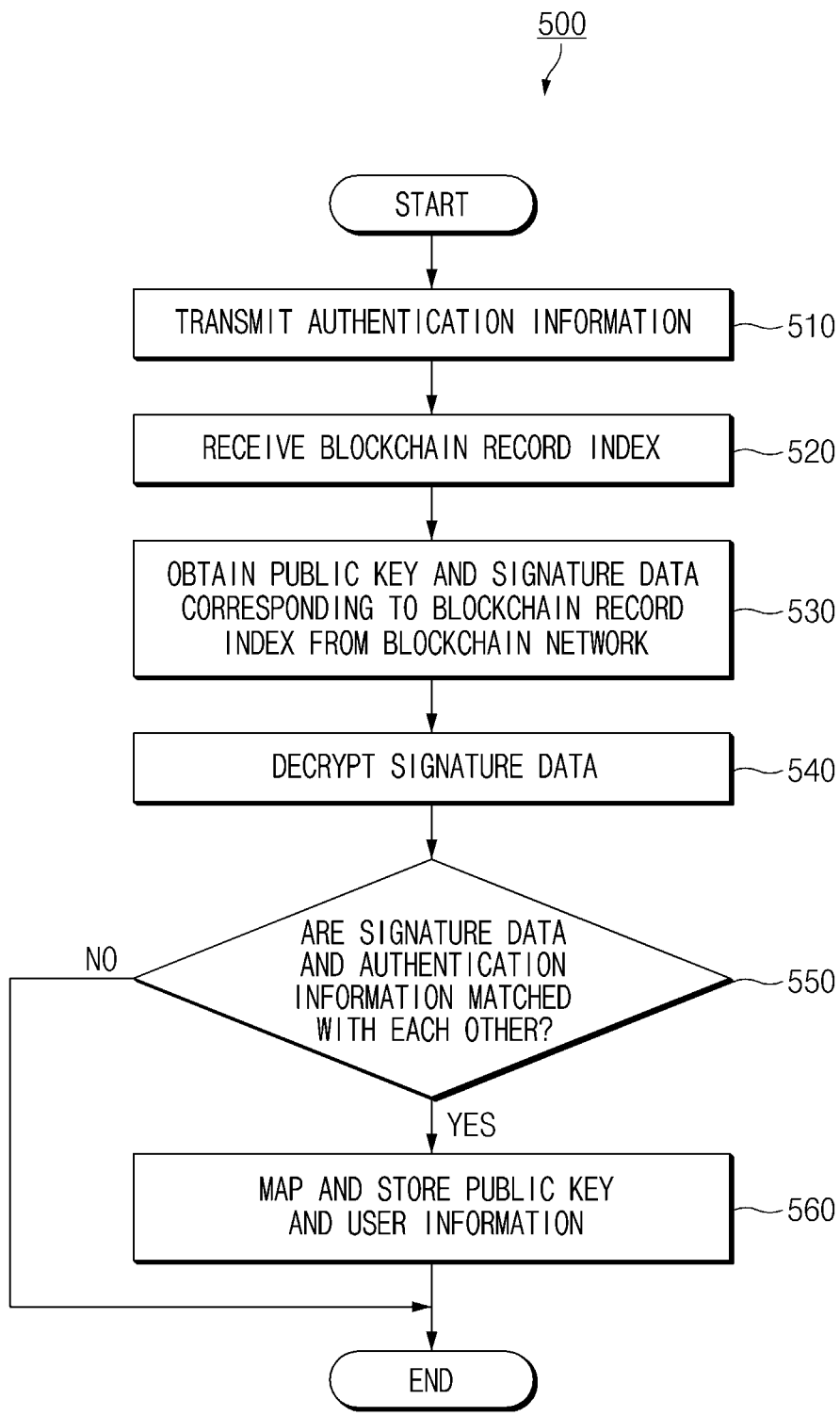
FIG. 9 is a flowchart illustrating a process performed to process electronic authentication by an authentication server, according to an embodiment of the disclosure.

FIG. 9 is a flowchart illustrating a process performed to process electronic authentication by an authentication server, according to an embodiment of the disclosure.

Referring to FIG. 9 depicting a flowchart 500, according to an embodiment, in operation 510, an authentication server (e.g., an authentication server 220 of FIG. 2) may transmit authentication information (first authentication information) to an electronic device (e.g., an electronic device 101 of FIG. 1 or an electronic device 210 of FIG. 2). According to an embodiment, the authentication server may further receive user information about a user of the electronic device which transmits a request for registration. The authentication server may search for user information (e.g., user information 225 of FIG. 2) stored in a database provided in the authentication server based on the received user information.

In operation 520, the authentication server may receive transaction identification information from the electronic device. For example, the authentication server may receive the transaction identification information including "0xBBBB" as a transaction ID.

In operation 530, the authentication server may read a public key and signature data corresponding to the transaction identification information from a blockchain network. For example, the authentication server may read data recorded in a block corresponding to the transaction ID included in the transaction identification information. A public key recorded by the electronic device may be stored in the other data item of the block corresponding to the transaction ID.

In operation 540, the authentication server may decrypt at least a portion of the signature data using the obtained public key. The authentication server may obtain authentication information (second authentication information) from the decrypted signature data. To identify whether the signature data is data signed using a private key forming a key pair with the public key, the authentication server may compare the authentication information (the second authentication information) obtained from the signature data with the authentication information (the first authentication information) transmitted to the electronic device. For example, the authentication server may generate data based on a public key of a user and a hash function from the first authentication information stored in the server. The authentication server may decrypt the signature data obtained from the blockchain network to obtain the second authentication information. The authentication server may identify whether it is signed by the same user using the second authentication information. According to an embodiment, the authentication server may identify the user using a value except for the first authentication information. For example, the authentication server may identify the user by further using pieces of information associated with the user and may identify whether the signature data and the authentication information are matched with each other using a series of algorithms associated with preventing denial of the electronic signature. When the authentication information (the second authentication information) obtained from the signature data and the authentication information (the first authentication information) transmitted to the electronic device are identical to each other, in operation 550, the authentication server may determine that the signature data and the authentication information are matched with each other. However, according to an embodiment, the authentication server may compare hash values obtained from authentication information rather than the authentication information itself to determine whether the first authentication information and the second authentication information are identical to each other.

When the signature data and the authentication information are matched with each other, in operation 560, the authentication server may map and store the public key and user information stored in the database. According to an embodiment, the user information mapped to the public key may be information corresponding to the user information (e.g., a phone number, a name, a gender, or an account ID) received together with the request for registration among pieces of information stored in the database.

Figure 10:
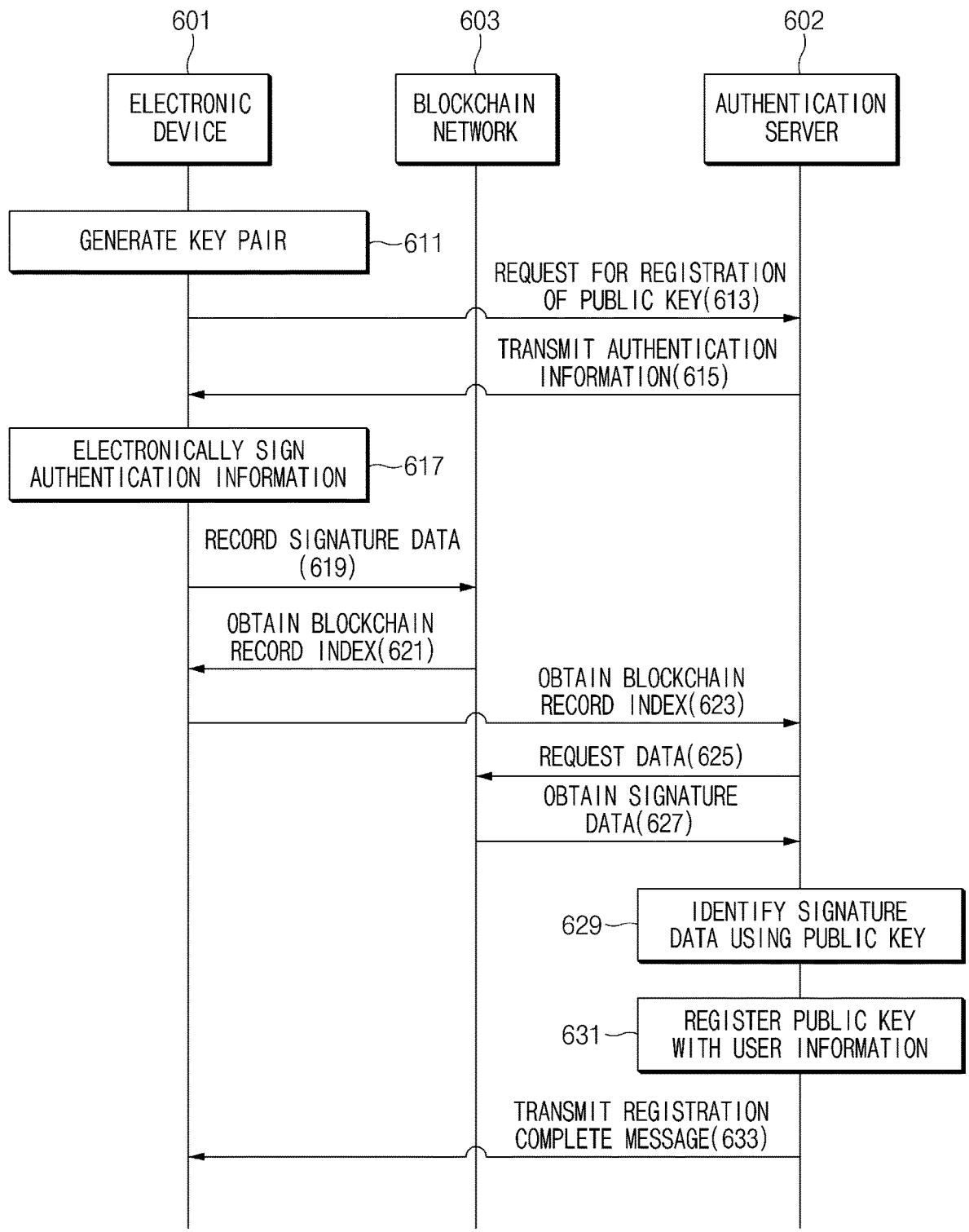
FIG. 10 is a signal sequence diagram illustrating a process of registering a public key with an authentication server, according to an embodiment of the disclosure.

FIG. 10 is a signal sequence diagram illustrating a process of registering a public key with an authentication server, according to an embodiment of the disclosure.

Referring to FIG. 10, in operation 611, an electronic device 601 (e.g., an electronic device 101 of FIG. 1 or an electronic device 210 of FIG. 2) may generate a key pair to be used for authentication. Herein, the key pair may include a public key and a private, which meet a condition (e.g., a length) available in a blockchain network 603 (e.g., a blockchain network 230 of FIG. 2).

In operation 613, the electronic device 601 may transmit a request for registration of the public key to an authentication server 602. The electronic device 601 may further transmit user information capable of identifying a user of a public key to be registered to the authentication server 602. To transmit the user information to the authentication server 602, the electronic device 601 may output a user interface for receiving user information and may further perform a separate authentication process for authenticating the user.

In operation 615, the authentication server 602 may generate authentication information (first authentication information) corresponding to the request for registration and may transmit the authentication information to the electronic device 601. When signature data signed for the authentication information is recorded in a blockchain, the authentication information may include information for identifying whether the user who records the signature data in the corresponding blockchain is a user who receives the authentication information. For example, the authentication information may include an OTP value or a nonce value.

In operation 617, the electronic device 601 may perform a digital signature for the authentication information. Herein, the electronic device 601 may encrypt the signature including the authentication information based on the private key in the key pair generated in operation 611.

In operation 619, the electronic device 601 may transmit transaction data including the signature data to the blockchain network 603 to record the signature data generated as a result of performing operation 617 in a blockchain node (e.g., a blockchain node 235 of FIG. 2) of the blockchain network 603 (e.g., the blockchain network 230 of FIG. 2). The node may perform verification (e.g., a mining work in the blockchain) for the transaction, and the transaction data, the verification of which is completed, may be included and stored in a block of the blockchain.

Herein, the electronic device may perform a digital signature to include the signature data and the public key, and may transmit transaction data including the signed data to the blockchain network such that the signed data is stored through the blockchain node 235.

In operation 621, the electronic device 601 may obtain transaction identification information about the block in which the signature data is recorded. In operation 623, the electronic device 601 may transmit the obtained transaction identification information to the authentication server 602.

In operation 625, the authentication server 602 may request data corresponding to the transaction identification information among data recorded in the block from the blockchain network 603. In operation 627, the authentication server 602 may obtain the data corresponding to the transaction identification information. The data obtained in operation 627 may include the signature data and the public key.

In operation 629, the authentication server 602 may identify the signature data using the obtained public key. The authentication server 602 may decrypt the signature data using the public key and may identify authentication information (the second authentication information) included in the signature data.

When the first authentication information and the second authentication information are identical to each other, in operation 631, the authentication server 602 may register the public key with user information of the authentication server 602. In other words, the authentication server 602 may map and store the public key and the user information. According to an embodiment, the second authentication information may be in the form of a hash value, and the first authentication information may be in the form of original authentication information (e.g., an OTP value or a nonce value). In this case, the authentication server 602 may obtain a hash value using a hash function from the first authentication information stored in the authentication server 602 to determine whether the first authentication information and the second authentication information are identical to each other. The authentication server 602 may compare the hash value obtained from the first authentication information with the second authentication information.

When the registration of the public key is completed, in operation 633, the authentication server 602 may transmit a registration complete message to the electronic device 601.

According to another embodiment, an electronic authentication system may further include a relay server which relays data transmission and reception between an electronic device 701 and an authentication server 702.

Figure 11:
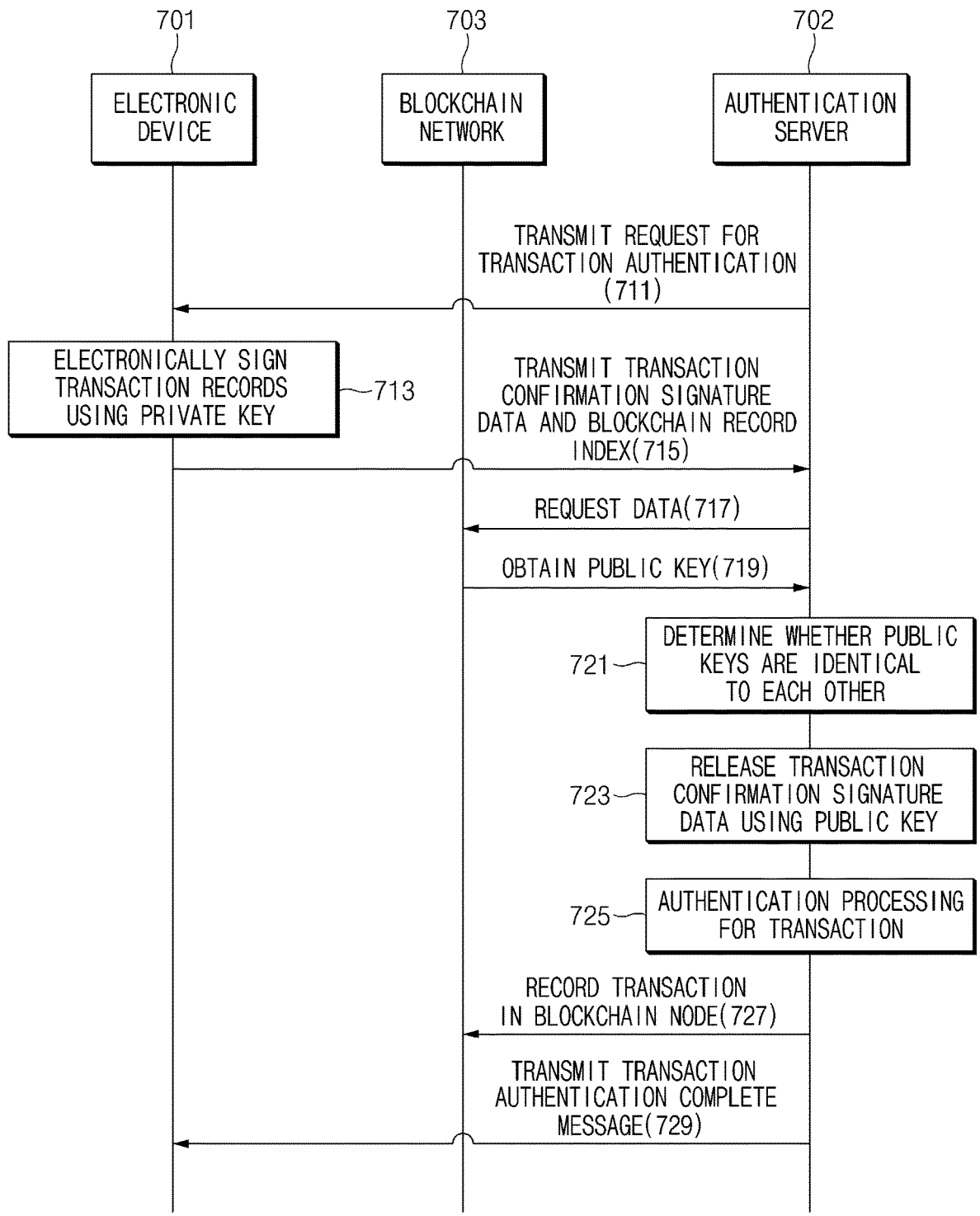
FIG. 11 is a signal sequence diagram illustrating a process of processing a transaction based on electronic authentication, according to an embodiment of the disclosure.

FIG. 11 is a signal sequence diagram illustrating a process of processing a transaction based on electronic authentication, according to an embodiment of the disclosure.

Referring to FIG. 11, according to an embodiment, a process shown in FIG. 11 may be performed after transmitting signature data to a blockchain network by an operation shown in at least one of FIGS. 7 to 10 and obtaining transaction identification information.

An authentication server 702 (e.g., an authentication server 220 of FIG. 2) may receive a request for authentication associated with a transaction. For example, when a user requests remittance from his or her account to another account from a bank server, the bank server (e.g., a transaction processing device 704) may request authentication for whether the user who requests the remittance is a legitimate user from the authentication server 702 (e.g., operation 709). For another example, when the user requests online payment, a payment processing device (e.g., the transaction processing device 704) which performs the online payment may request authentication for the user who requests the online payment from the authentication server 702 (e.g., operation 709).

In response to the request for the authentication of the user, in operation 711, the authentication server 702 may transmit a request for transaction authentication to an electronic device 701 (e.g., an electronic device 101 of FIG. 1 or an electronic device 210 of FIG. 2) registered as a user device associated with a transaction. According to an embodiment, in operation 709, the authentication server 702 may transmit the request for transaction authentication to the electronic device 701 using information (e.g., a phone number, a user name, or a user account ID) capable of identifying the electronic device 701 or a user of the electronic device 701, which is received from the transaction processing device 704. The request for transaction authentication may include transaction records of a transaction which is subject to authentication. The transaction records may include, for example, information about an amount, a sender, or a transaction target.

In operation 713, the electronic device 701 may perform a digital signature for the transaction records based on a private key. In operation 713, the electronic device 701 may output information about the transaction records in conjunction with the digital signature such that the user identifies the transaction records. Furthermore, when receiving a user input for whether the user who identifies the transaction records proceeds with a digital signature, the electronic device 701 may perform the digital signature. According to an embodiment, the electronic device 701 may obtain a hash value using hash from the transaction records. The electronic device 701 may perform a digital signature for the obtained hash value.

In operation 715, the electronic device 701 may transmit transaction confirmation signature data and transaction identification information to the authentication server 702.

According to an embodiment, the transaction identification information may be transaction identification information obtained over the blockchain network. The transaction confirmation signature data may include data where the electronic device 701 performs a digital signature for the transaction records based on a private key. The transaction identification information transmitted in operation 715 may be generated when the electronic device 701 records a public key in the blockchain network 703.

In operation 717, the authentication server 702 may request data from the blockchain network 703 based on the transaction identification information. In operation 719, the authentication server 702 may obtain a public key from data recorded in a block corresponding to the transaction identification information.

In operation 721, the authentication server 702 may determine whether the public key registered with the authentication server 702 and the public key obtained from the blockchain network 703 are identical to each other. When the public key registered with the authentication server 702 and the public key obtained from the blockchain network 703 are not identical to each other, the authentication server 702 may determine that there is a problem in the registered public key and may stop processing the transaction. According to an embodiment, when the registered public key and the obtained public key are not identical to each other, a message requesting re-registration of the public key may be transmitted to the electronic device 701.

When the public key registered with the authentication server 702 and the public key obtained from the blockchain network 703 are identical to each other, in operation 723, the authentication server 702 may identify the transaction confirmation signature data using the registered public key. According to an embodiment, the authentication server 702 may obtain a hash value from the transaction confirmation signature data. When the hash value generated from the transaction records stored in the authentication server 702 and the obtained hash value are identical to each other, the authentication server 702 may determine that the transaction confirmation signature data is digitally signed based on a private key forming a pair with the public key. When it is determined that the digital signature is legitimately performed, in operation 725, the authentication server 702 may perform authentication processing for the transaction. For example, in operation 725, the authentication server 702 may transmit information about the authentication result to the transaction processing device 704.

When the requested transaction is performed, in operation 727, the authentication server 702 may record the performed transaction in a blockchain node. However, because the operation of recording the transaction in the blockchain node is able to incur costs, operation 727 may be excluded according to an embodiment. According to another embodiment, the operation of recording the transaction performed in the blockchain node in operation 727 may be conditionally performed. For example, when the number of performed transactions is accumulated by a predetermined value or when a transaction amount is accumulated above a predetermined value, operation 727 may be performed.

When the requested transaction is performed, in operation 729, the authentication server 702 may transmit a transaction authentication complete message to the electronic device 701. According to an embodiment, the electronic device 701 may output information included in the transaction authentication complete message.

Figure 12:
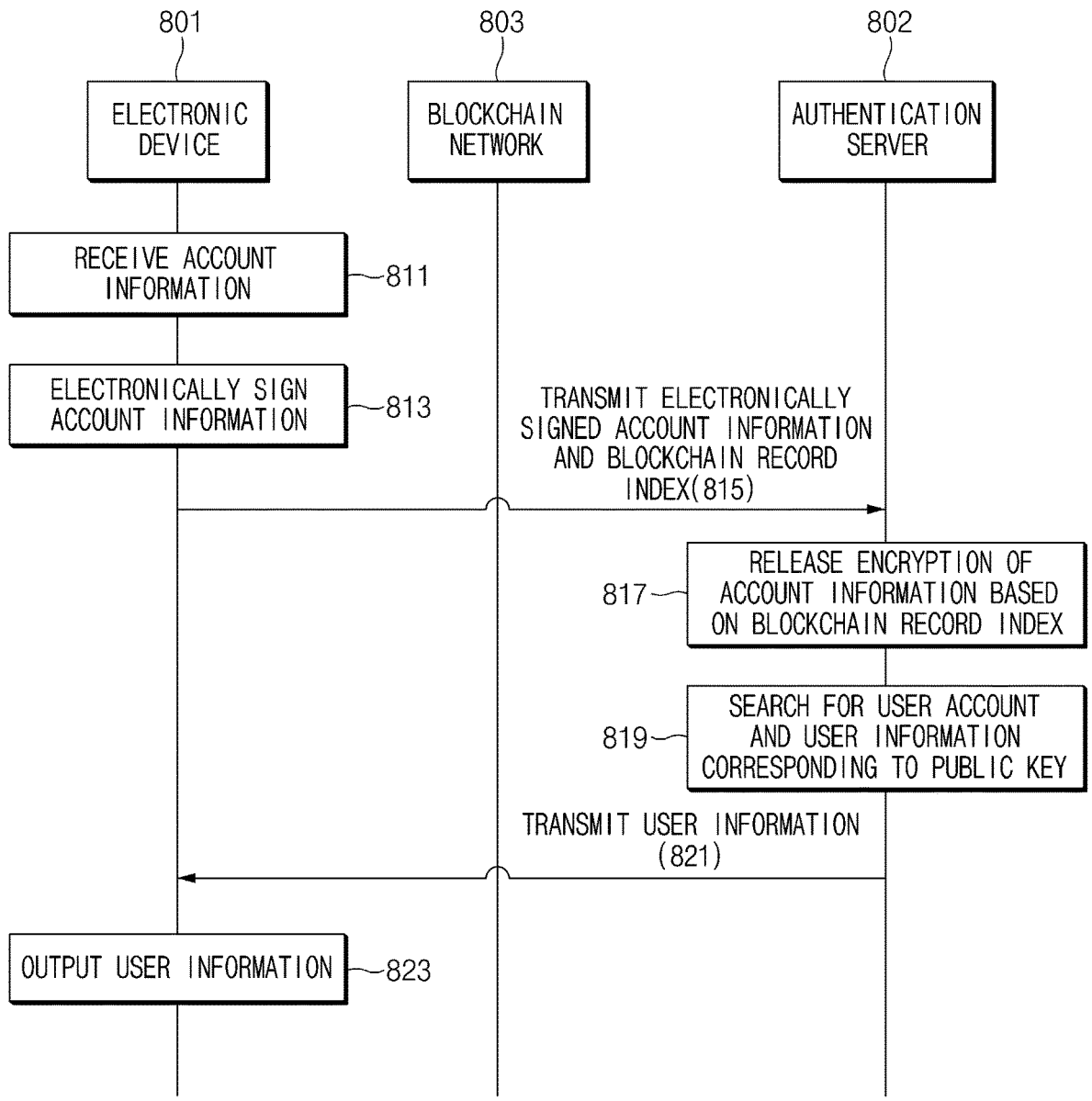
FIG. 12 is a signal sequence diagram illustrating a process of processing a blockchain transaction based on electronic authentication, according to an embodiment of the disclosure.

FIG. 12 is a signal sequence diagram illustrating a process of processing a blockchain transaction based on electronic authentication, according to an embodiment of the disclosure.

Referring to FIG. 12, an authentication scheme according to various embodiments may be used to process a blockchain transaction based on a digital currency. According to an embodiment, a process shown in FIG. 12 may be performed after transmitting signature data to a blockchain network by an operation shown in at least one of FIGS. 7 to 10 and obtaining transaction identification information.

An electronic device 801 (e.g., an electronic device 101 of FIG. 1 or an electronic device 210 of FIG. 2) may perform a transaction (e.g., remittance of a digital currency or payment by means of a digital currency) using a digital wallet application installed in the electronic device 801. In operation 811, the electronic device 801 may receive account information which is subject to remittance or payment.

In operation 813, the electronic device 801 may perform a digital signature for the input account information based on a private key. Herein, the private key may be a key value generated as a pair with a public key registered with the authentication server 802.

In operation 815, the electronic device 801 may transmit the digitally signed account information and the transaction identification information to the authentication server 802. The transaction identification information transmitted in operation 815 may include information assigned when the electronic device 801 records signature data in a blockchain network 803 (e.g., a blockchain network 230 of FIG. 2) to register the public key with the authentication server 802.

When the transaction identification information, the user information, and the public key are mapped and stored in a database, in operation 817, the authentication server 802 may release encryption of the account information based on the transaction identification information. In other words, the authentication server 802 may search for user information and a public key mapped to the transaction identification information and may decrypt the account information using the found public key.

According to an embodiment, in operation 817, the authentication server 802 may further perform an operation of reading a public key from the blockchain network 803 based on the transaction identification information and comparing the public key obtained from the blockchain network 803 with the public key found from the authentication server 802. In this case, only when the public key obtained from the blockchain network 803 and the public key found from the authentication server 802 are identical to each other, the authentication server 802 may perform operation 817 of releasing the encryption of the account information. The authentication server 802 may process authentication such that the transaction proceeds only when the account information is normally decrypted by the public key.

In operation 819, the authentication server 802 may search for user information based on the account information. Because the public key, the account information, and the user information are mapped and stored in the database in the process of registering the public key, the authentication server 802 may search for the user information based on the account information. In operation 821, the authentication server 802 may transmit the user information to the electronic device 801. In operation 823, the electronic device 801 may output the received user information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a communication device configured to transmit or receive a signal;
    a memory; and
    a processor electrically connected with the communication device and the memory,
    wherein the memory stores instructions which, when executed by the processor, cause the electronic device to:
        generate a key pair including a public key and a private key,
        transmit a request for registration of the public key and user information to an authentication server through the communication device, wherein the request includes the public key,
        receive, in response to the request, authentication information from the authentication server using the communication device,
        digitally sign the authentication information based on the private key to generate signature data,
        generate transaction data including the signature data,
        transmit the transaction data to a blockchain network for storing the signature data in a node of the blockchain network,
        receive transaction identification information corresponding to the transaction data from the blockchain network,
        transmit the transaction identification information corresponding to the transaction data to the authentication server through the communication device, and
        receive a registration complete message indicating the public key is registered with the user information included in the authentication server from the authentication server when the authentication server successfully authenticates a user of the electronic device by using the signature data stored in the node of the blockchain network.

2. The electronic device of claim 1, wherein the signature data includes a value generated by encrypting the authentication information using the private key.

3. The electronic device of claim 1, wherein the instructions further cause the electronic device to:
control the communication device to transmit a digital currency transaction request including account information digitally signed using the private key and the transaction identification information to the authentication server.

4. The electronic device of claim 1, wherein the instructions further cause the processor electronic device to:
generate the key pair based on a root seed of the blockchain network.

5. The electronic device of claim 1, wherein the instructions further cause the electronic device to:
receive transaction authentication request data including transaction records from the authentication server through the communication device,
digitally sign the transaction records based on the private key to generate transaction confirmation signature data, in response to the transaction authentication request data, and
transmit the transaction confirmation signature data and the transaction identification information to the authentication server.

6. The electronic device of claim 1, wherein the authentication information includes at least one of an OTP (one time password) or a nonce value.

7. An authentication server, comprising:
a communication device configured to communicate or receive a signal;
a database configured to store user information; and
a memory; and
a processor electrically connected with the communication device and the memory,
wherein the memory stores instructions which, when executed by the processor, cause the authentication server to:
receive a request for registration of a public key from an electronic device, wherein the request includes the public key,
in response to the request, transmit first authentication information to the electronic device through the communication device,
receive transaction identification information from the electronic device through the communication device in response to the first authentication information,
obtain signature data from a blockchain network using the transaction identification information,
obtain second authentication information using the public key from the signature data,
authenticate a user of the electronic device using the second authentication information and the first authentication information,
map and store the public key and the user information in the database, based on a result of authenticating the user, and
transmit a registration complete message indicating the public key is registered with the user information to the electronic device,
wherein the transaction identification information includes information related to a node of the blockchain network where the signature data is stored by the electronic device.

8. The authentication server of claim 7, wherein the instructions further cause the authentication server to:
obtain transaction data stored in a block of a blockchain network, based on the transaction identification information, and obtain the signature data included in the transaction data.

9. The authentication server of claim 7, wherein the instructions further cause the authentication server to:
map and store the transaction identification information and the user information in the database.

10. The authentication server of claim 9, wherein the instructions further cause the authentication server to:
receive a digital currency transaction request including encrypted account information and the transaction identification information through the communication device, and
search for the public key corresponding to the transaction identification information, in response to the digital currency transaction request, decrypt the account information using a found public key, and perform a transaction based on a user account corresponding to the public key and the account information.

11. The authentication server of claim 7, wherein the instructions further cause the authentication server to:
transmit transaction authentication request data including transaction records to the electronic device through the communication device,
receive a transaction confirmation signature data corresponding to the transaction authentication request data from the electronic device through the communication device,
search for the public key corresponding to the transaction identification information, and
decrypt the transaction confirmation signature data using a found public key.

12. The authentication server of claim 11, wherein the instructions further cause the authentication server to:
decrypt the transaction confirmation signature data using the public key and perform a transaction corresponding to the transaction records, in response to the decrypted transaction confirmation signature data being data signed by the user.

13. The authentication server of claim 11, wherein the instructions further cause the authentication server to:
read a public key from the blockchain network using the transaction identification information, and
determine whether the read public key and a public key stored in the authentication server are identical to each other.

14. A method for controlling an electronic device to process electronic authentication, the method comprising:
generating a key pair including a public key and a private key of a user;
transmitting a request for registration of the public key and user information to an authentication server, wherein the request includes the public key;
receiving, in response to the request, authentication information from an authentication server;
digitally signing the authentication information based on the private key to generate signature data;
generating transaction data including the signature data;
transmitting the transaction data to a blockchain network for storing the signature data in a node of the blockchain network;
receiving transaction identification information corresponding to the transaction data from the blockchain network;

transmitting the transaction identification information corresponding to transaction data to the authentication server; and receiving a registration complete message indicating the public key is registered with the user information included in the authentication server from the authentication server when the authentication server successfully authenticates a user of the electronic device by using the signature data stored in the node of the blockchain network.

15. The method of claim 14, further comprising:

receiving, by the electronic device, transaction authentication request data including transaction records from the authentication server;

digitally signing the transaction records based on the private key to generate transaction confirmation signature data, in response to the transaction authentication request data; and transmitting the transaction confirmation signature data and the transaction identification information to the authentication server.

16. A method for performing electronic authentication in an authentication server having user information, the method comprising:

receiving a request for registration of a public key from an electronic device, wherein the request includes the public key;

in response to the request, transmitting first authentication information to the electronic device;

receiving transaction identification information from the electronic device in response to the first authentication information;

obtaining signature data from a blockchain network using the transaction identification information;

obtaining second authentication information using the public key from the signature data;

authenticating a user of the electronic device using the second authentication information and the first authentication information;

mapping and storing the public key and the user information in a database of the authentication server; and transmitting a registration complete message indicating the public key is registered with the user information to the electronic device, wherein the transaction identification information includes information related to a node of the blockchain network where the signature data is stored by the electronic device.

* * * * *